(12) United States Patent
Anderson et al.

(10) Patent No.: US 9,225,152 B2
(45) Date of Patent: Dec. 29, 2015

(54) MULTI-FUNCTION WIRE STRIPPING HAND TOOL AND KIT AND METHOD FOR USING SAME

(71) Applicants: Wayne Anderson, Northport, NY (US); Warren Anderson, Northport, NY (US)

(72) Inventors: Wayne Anderson, Northport, NY (US); Warren Anderson, Northport, NY (US)

( * ) Notice: Subject to any disclaimer, the term of this patent is extended or adjusted under 35 U.S.C. 154(b) by 0 days.

(21) Appl. No.: 14/671,276

(22) Filed: Mar. 27, 2015

(65) Prior Publication Data

US 2015/0280406 A1 Oct. 1, 2015

Related U.S. Application Data

(60) Provisional application No. 61/972,757, filed on Mar. 31, 2014.

(51) Int. Cl.
*H02G 1/12* (2006.01)
*B25F 1/02* (2006.01)

(52) U.S. Cl.
CPC ............... *H02G 1/1214* (2013.01); *B25F 1/02* (2013.01)

(58) Field of Classification Search
CPC . H02G 1/1204; H02G 1/1214; H02G 1/1224; B25F 1/02; B25F 1/04
USPC .................................................... 7/107, 108
See application file for complete search history.

(56) References Cited

U.S. PATENT DOCUMENTS

| | | | | |
|---|---|---|---|---|
| 2,807,810 A * | 10/1957 | Belek et al. | ......... | H01R 43/033 140/124 |
| 2,848,914 A * | 8/1958 | Gottfried | ............ | H02G 1/1214 30/90.1 |
| 3,114,277 A * | 12/1963 | Clendenin | ........... | H02G 1/1214 30/113 |
| 3,360,808 A * | 1/1968 | Taysom | .............. | H01R 43/033 140/124 |
| 3,608,401 A * | 9/1971 | Freed | ................... | H02G 1/1214 7/108 |
| 4,366,619 A * | 1/1983 | Bieganski | ............ | H02G 1/1224 30/113 |
| 4,640,009 A * | 2/1987 | Liversidge | .......... | H02G 1/1224 29/828 |
| 5,398,413 A * | 3/1995 | Chen | .................... | H02G 1/1224 30/90.1 |
| 5,956,789 A * | 9/1999 | Chou | ..................... | B25B 15/00 30/90.1 |
| 6,081,953 A * | 7/2000 | Chou | ....................... | B25B 7/22 30/90.1 |
| 7,137,204 B2 * | 11/2006 | Wiste | ................... | H02G 1/1214 30/113 |
| 8,621,961 B2 * | 1/2014 | Burch | .................... | B25B 15/02 7/107 |
| 8,650,988 B2 * | 2/2014 | Yen | ......................... | B25F 1/02 7/108 |
| 8,733,212 B2 * | 5/2014 | Liu | ........................... | B25F 1/02 7/107 |
| 9,056,392 B2 * | 6/2015 | Anderson | ............ | B25G 1/085 7/164 |
| 2004/0025259 A1 * | 2/2004 | Yen | ........................ | B25F 1/003 7/108 |
| 2010/0269263 A1 * | 10/2010 | Burch | .................... | B25B 15/02 7/108 |
| 2013/0240078 A1 * | 9/2013 | Anderson | .............. | B21F 1/002 140/123 |
| 2014/0082850 A1 * | 3/2014 | Stokes | ................... | H02G 1/005 7/108 |
| 2014/0366278 A1 * | 12/2014 | Wang | .................... | B25B 15/00 7/108 |

* cited by examiner

*Primary Examiner* — David B Thomas
(74) *Attorney, Agent, or Firm* — Andrew F. Young, Esq.; Lackenbach Siegel, LLP

(57) ABSTRACT

A multi-function wire stripping hand tool generally for electricians that has a wire stripping system for a controlled cut and strip of the insulation from a wire. The tool includes an elongated body member having a longitudinal cavity and a transverse opening therein which communicates with the longitudinal cavity and one end of the body member. A stationary cutting blade is disposed in the inner end of the longitudinal cavity, and a movable cutting blade is movably mounted within an upper end of the longitudinal cavity. A spring is disposed between and engaged with a push button actuator so as to urge the movable blade to an open and retracted position. The wire stripping system is engaged with a handle region of the hand tool, and permits stripping in a direction that is perpendicular a longitudinal axis of the multi-function hand tool. The wire stripping system may be used from either side of the hand tool, and may be provided with a plurality of first and second operably engaged housings for securing a number of tool bit members.

36 Claims, 11 Drawing Sheets

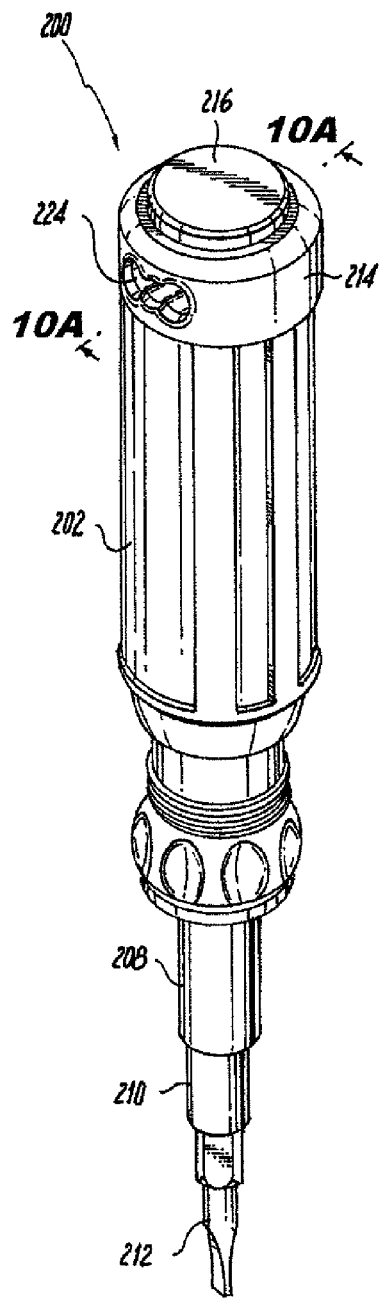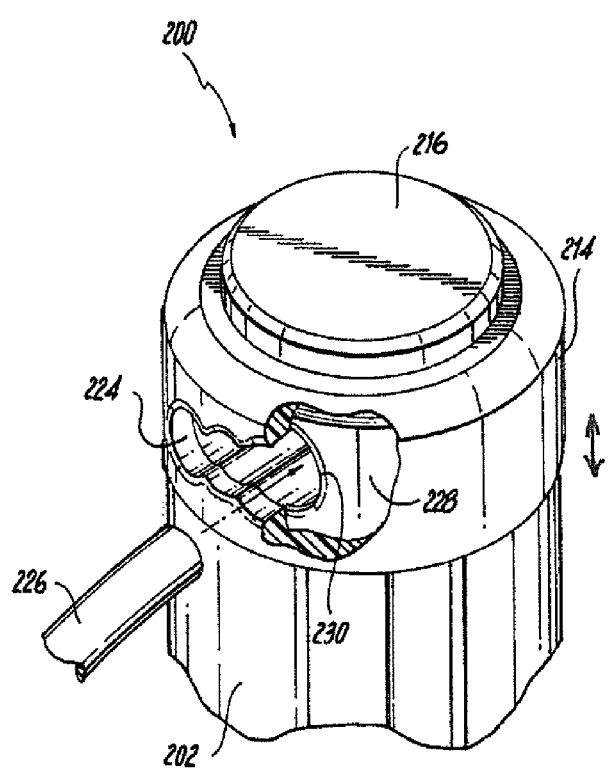
Fig. 4
Fig. 5

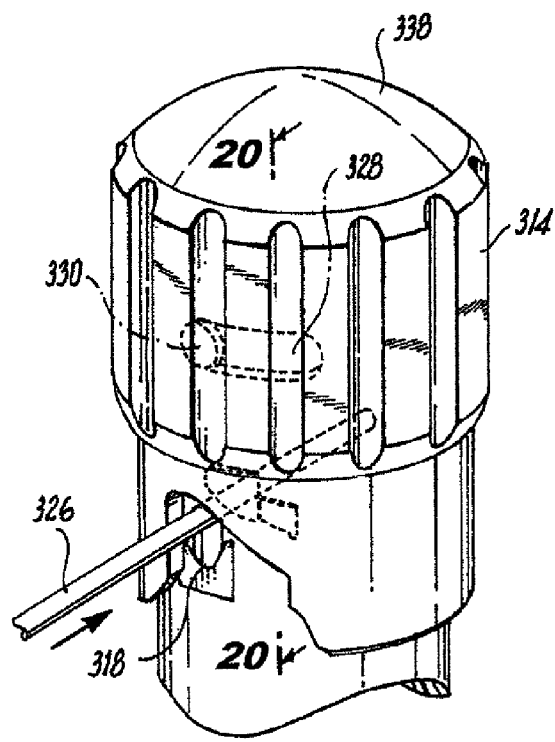
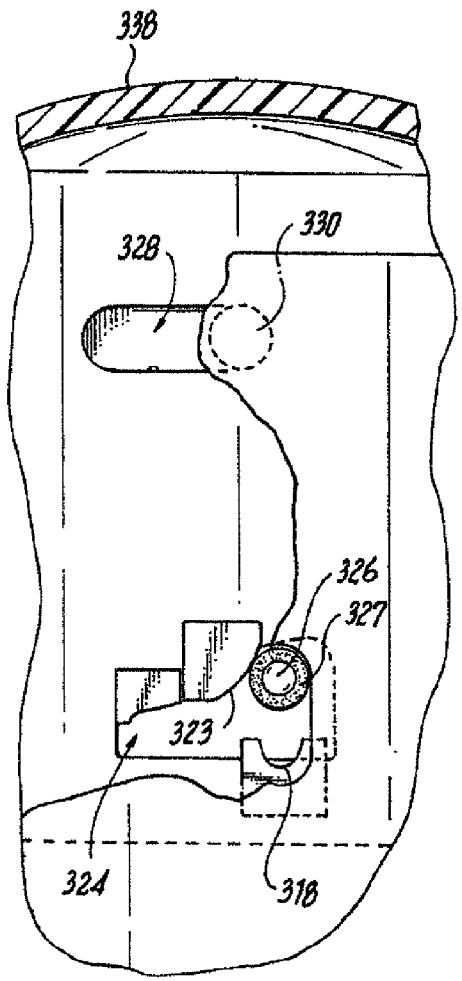
Fig. 19
Fig. 20

MULTI-FUNCTION WIRE STRIPPING HAND TOOL AND KIT AND METHOD FOR USING SAME

CROSS REFERENCE TO RELATED APPLICATIONS

This application relates to and claims priority from U.S. Prov. Ser. No. 61/972,757 filed Mar. 31, 2014, the entire contents of which are incorporated herein by reference.

FIGURE SELECTED FOR PUBLICATION

FIG. 4

BACKGROUND OF THE INVENTION

1. Field of the Invention

The present invention relates generally to hand tools and more particularly a device for stripping the insulation cover from an insulated wire such as those normally employed for transmitting electrical energy in a building with an improved ergonomic function. More particularly, the present invention relates to an electrical installer hand tool having a convenient and easy to use wire stripping mechanism for stripping an insulation layer from a wire during use of the hand tool that provides for an improved stripping-motion by a user and results in reduced hand and forearm stress and correspondingly to reduced risk of long term injury through repetitive use created by common wire stripping systems.

2. Description of the Related Art

Electricians, among others, typically require a number of tools for assisting in the various operations they normally conduct in the ordinary course of business. One of the tools normally required by an electrician is a screwdriver. Also, the electrician normally employs some type of tool, typically a scissor-action type hand tool operably provided with two handles and a crossed pivot point, for aiding in the removal of insulation from an end portion of an insulated wire for enabling the wire to be connected to a terminal post or the like. An electrical wire generally comprises an inner core of conductor that is surrounded by an insulation layer. When the electrical wire is joined to other wires or connected to a terminal, the insulation needs to be removed. The purpose of a wire stripping apparatus is to remove the insulation from around the core of the wire to expose the core of the wire.

Wire strippers or wire stripping devices are used by electricians and other professionals to separate a short segment of insulation from a wire to expose the underlying conducting wire for making connections. For small gauge wires, a wire stripping pliers, utility knife, or other hand tool may typically be used. For larger gauge wires, where the insulation layer is typically thicker and more rigid, it is more difficult to remove with hand tools. Unfortunately, damage may be caused to the underlying conductor when penetrating the insulation layer with a manual cutting tool (such as a wire cutter or knife) due to imprecise cutting depth control. Rather elaborate tools have been previously provided for stripping the insulation from the wire, but these tools can be relatively expensive and have only the single purpose of removing insulation. Thus, such tools are burdensome to carry and occupy a considerable space area within the tool box or wherever it is carried. Additionally, these tools are commonly such scissor-action types as noted in FIG. 1. Unfortunately such scissor-action types require a user to pull against the axis of the wire to strip the outer insulation and this creates a stress on a user's forearm, wrist, hand, and even upper arm. Typically, after much stripping (by a professional installer) a sort of wire-strippers-elbow can result from damage to the wrist and elbow muscles, ligaments, and tendons due to the constant outwardly stress. Even worse, should a user flex their wrist (not maintain a rigid wrist aligned with the forearm) then carpal tunnel syndrome can occur. References to such stresses, and the damages to the same, can be found discussed in "Finger Force Capability: Measurement and Prediction Using Anthropometric and Myoelectric Measures"; Angela D. Astin, a thesis, Virginia Polytechnic Institute and State University, Dec. 16, 1999, the entire contents of which are incorporated herein by reference.

Also, other known wire stripping devices include the type comprising a pair of V-shaped cutters that are provided opposite to an insulated wire and blades of the cutters are moved toward the insulated wire to cut into the insulation from opposite sides without damaging the core, and the cutters are caused to move in the lengthwise direction of the wire to remove the insulation. According to this type of stripper in which the blades are caused to move in the length of the wire, if cross sectional shapes of wire and/or core are not uniform in the lengthwise direction of wire or if an adhesion between the core and the insulation is strong, it may be difficult to strip the insulation from the wire properly. Moving the blades cutting into the insulation along the lengthwise direction of the wire may result in damage to the core.

Another type of wire stripping device relates to an assisting tool for wire stripping in which a cut is formed in the insulation by using heated blades. In stripping the insulation using this tool, a separate process is required to pull out the insulation from an end of the wire. It is difficult to pull the insulation if the length of the insulation to be removed is short. It is also difficult to twist strands of the core by pulling out the insulation to keep the strands together.

Also known as wire stripping (and cutting) tools are wire stripping knives, generally for the stripping of the outer insulation of a wire from the core portion. Such a wire stripping knife has blade and handle members with the handle member having a forward and rearward portion as well as a base surface. In such a tool, a stripping mechanism is attached to the handle and has both open and closed orientations. The stripping mechanism has an inward surface operatively configured to engage the wire to be stripped where the inward surface of the stripping mechanism cooperates with the base surface of the handle such that when in a closed orientation, either the inward surface or the base surface incises the insulation of the wire from the core portion.

Wire strippers or wire stripping tools have been around since the use of insulation began. One such tool uses a pivoting handle to operate a pair of jaws. The jaws have a wire cutter and a series of cutters designed to fit around and clamp through the insulation of a specific size wire, but not cut the wire itself. Retelling to FIGS. 1-3, shown is a typical prior art wire stripping tool 100. As shown, this tool 100 has a cutting head 101, and a pair of handles 102 connected by a pivot assembly 103. The tool 100 is used by opening and closing the handles 102 to activate the cutting head 101. The cutting head 101 has a pair of jaws which act as a crimper or pliers jaw 105. Below that is a series of upper and lower cutting jaws 106 for stripping the wire 121. These jaws are used to strip the insulation off wire 121, and each cutting jaw 106 is sized for a different wire gauge. At the bottom of the cutting head 101 are two holes 120 that can be used for bending wires.

Accordingly, this invention now recognizes that there is a need for a wire stripping assembly incorporated into the handle of a screwdriver or other multi-function tool whereby the tool will be effective for its normal uses and operations and includes a wire stripping mechanism that adds very little to the weight and bulkiness of the tool and which facilitates easy and effective stripping of the insulation from a wire while eliminating damages to a core.

ASPECTS AND SUMMARY OF THE INVENTION

The present invention relates to hand tools and more particularly to a wire cutting and stripping tool of improved construction. A wire stripping multi-function hand tool is provided generally for electricians that has a wire stripping system for a hand tool for forming a controlled cut and strip of the insulation from a wire. The tool includes an elongated body member having a longitudinal cavity and a transverse opening therein which communicates with the longitudinal cavity and one end of the body member. A stationary cutting blade is disposed in the inner end of the longitudinal cavity, and a movable cutting blade is movably mounted within an upper end of the longitudinal cavity. A spring is disposed between and engaged with a push button actuator so as to urge the movable blade to an open and retracted position. The wire stripping system is engaged with a handle region of the hand tool, and permits stripping in a direction that is perpendicular a longitudinal axis of the multi-function hand tool. The wire stripping system may be used from either side of the hand tool, and may be provided with a plurality of first and second operably engaged housings for securing a number of tool bit members.

Preferably, a wire stripping tool and kit therefor is disclosed which includes an elongated body member having a longitudinal bore and a transverse opening or bore therein. The transverse opening communicates with the longitudinal through-bore and one end of the body member. A stationary cutting blade is disposed in the inner end of the longitudinal cavity, a movable blade longitudinally movably mounted within the longitudinal cavity. The movable blade is continuous in an overlapping relation with the stationary blade, and an actuator in the form of a push button is connected to the movable blade. A spring is disposed between and engaged with the push button actuator so as to urge the movable blade to an open and retracted position. Preferably the stationary and movable cutting blades have a curved shape to mirror the shape or configuration of a wire to be stripped, and each has a plurality of sizes of curved cutting members thereon for stripping different gauge or size wires.

When in an open or retracted position, the arced or curved areas of the movable and stationary blades define an opening therebetween which is aligned with the transverse opening or bore. A cavity is defined within a central longitudinal region of the tool for defining a guide region for the movable blade. The guide region includes lateral openings the side walls thereof for allowing the wire to pass therethrough when the movable blade is in an open position. The openings in the side walls are preferably aligned with the transverse bore in the elongated body and the sharpened edges of the movable and stationary blades. The stationary blade is preferably securely fixed in position within the cavity and secured to the inner side walls thereof, and is configured so as to be slightly offset with respect to the movable blade such that when brought together the blades meet to cut into the entire circumference of the wire sheathing but not the wire core in order to strip the sheathing from the wire core.

The wire stripping tool disclosed herein improves on the prior art in a number of ways. Among other things, it is comfortable, inexpensive as compared to traditional wire stripping tools, does not require excessive force to strip wire, readily adaptable to a user's needs, is simple to use, and is configured for multiple size or gauge wires. The invention consists briefly of a multipurpose tool of simple and sturdy construction, and which combines in one tool any of a variety of hand tools, such as a flat head screw driver, a crossed head screw driver, etc., with a wire cutter/stripper and a wire bending and shaping device. The device of the invention accordingly provides a very useful tool and one which not only saves time but saves material as well. Furthermore, utilizing the invention a single tool is provided which enables one to perform the work of three or four or more conventional tools. The invention saves not only time but the expense of providing an assortment of tools.

A multi-function wire stripping hand tool is provided comprising a handle having a first end, a second end, and a longitudinal cavity therein, the first end having a transverse bore therethrough; a plurality of tool bit members; a coupling member having a proximate end disposed in and extending from the first end of the handle, the coupling member having a distal end for receiving an end of at least one of the plurality of tool bits; and a wire stripping mechanism further comprising an actuator longitudinally positioned with respect to the handle; first and second blade members; a spring member disposed between the actuator and the first end, the spring member for urging the second blade member to an open position; and a retaining cap member for securing the actuator and the spring on the first end; wherein first and second blade members are slidably engaged within the cavity upon longitudinal actuation of the actuator to engage a wire and circumferentially sever a sheathing on the wire.

Also provided is a multi-function wire stripping tool comprising an elongated handle member having a longitudinal bore in communication with a transverse bore therein, said longitudinal bore communicating with one end of said handle member; a first cutting blade disposed at an inner end of said longitudinal bore, a second cutting blade longitudinally mounted within said longitudinal bore, said second cutting blade being positioned for an overlapping relation to said first cutting blade; and an actuator connected to said second cutting blade with a spring disposed between said actuator and said handle member for urging said second cutting blade to an open position, said first and second blades each having curved cutting edges defining an opening therebetween aligned with said transverse bore when said second blade is in said open position.

In accordance with the invention, it is also understood that there is a kit for providing a multi-function wire stripping hand tool comprising a hand tool having an elongated handle portion and a coupling member; a plurality of tool members; a storage container having a plurality of cavities for housing said hand tool and said plurality of components; and a wire stripping mechanism comprising an actuator longitudinally positioned with respect to said handle; first and second blade members; a spring member disposed between said actuator and said first end; and a retaining cap member for securing said actuator and said spring on said first end; wherein said coupling member is configured for removably receiving at least one of said plurality of tool members.

A wire stripping system in a multi-function hand tool is also provided, which comprises a wire stripping member operably disposed within a first end of a handle of a hand tool; said wire stripping member including an actuator longitudinally positioned with respect to said handle, first and second blade members, a spring member disposed between said actuator and said first end, and a retaining cap member for securing said actuator and said spring on said first end; said handle defining a hand tool axis; tool bit members, each tool bit member being formed with oppositely disposed tool bit ends; a coupling member having a proximate end and a distal end, said coupling member comprising means for removably, non-rotatably, holding said coupling member proximate end in said handle, said coupling member comprises a unitary one-piece first housing having oppositely disposed open ends and two unitary one-piece second housings having oppositely disposed open ends, each of said second housings being slidably non-rotatably received in the respective opposite ends of the first housing, said first tool bit member being slidably disposed in one second housing end, and said second tool bit member being slidably disposed in said other second housing end, whereby each tool bit is alternatively operably disposed in the distal end of said coupling member.

It is an important aspect of the invention to provide a multi-function wire stripping hand tool that minimizes stress on the user's hands thereby preventing injuries or general pain to the user's wrist area as is common with the plier-type stripping tools known in the art.

Still another aspect of the invention is to provide a single tool having the multi-function character described above in a single hand tool wherein parts which accomplish these results are interrelated and which cooperate together as single unitary tool.

Another aspect of the invention is to provide a tool of the character described wherein the handle functions to provide various tool members and which may be manipulated in a manner to carry out the several operations as commonly accomplished with the use of several tools or devices.

Still another aspect of my invention is to provide a combination tool of the character described which has particular utility in electronic work as an electrician's multi-function hand tool. The tool in accordance with the invention may be employed efficiently to cut/strip electrical wires, twist, bend and shape the wires in the form of a loop, or the like, and serve as a conventional screw driver, for example.

In another aspect of the present invention, a kit for a multi-function wire stripping hand tool ideal for electricians is provided comprising a hand tool having an elongated handle portion and a coupling member, a plurality of tool members, and a storage container having a plurality of cavities for housing said hand tool and said plurality of components, wherein said coupling member is configured for removably receiving at least one of said plurality of tool members.

It is yet another aspect of the present invention to provide a wire stripping assembly incorporated into the handle of a multi-function hand tool whereby the tool will be effective for any of a multitude of normal uses and operations and whereby the wire stripping device adds very little to the weight and bulkiness of the screwdriver.

Another very important aspect of the present invention is to provide a wire stripping device having a stationary and movable arced or curved blades together with an easily accessible actuator or push button member connected with the movable blade whereby accurate pressure may be exerted on the movable blade for determining when the movable blade contacts the metallic wire thus assuring that the wire will not be partially cut through by the blade. Preferably, the movable blade and stationary blade are configured so as to not allow the blades to fully cut the wire, and rather have a plurality of arches or curved blade regions for stripping wires of different sizes or gauges.

Still another aspect of the present invention is to provide a wire stripping device disposed longitudinally within the handle of the multi-function hand tool and having outwardly flared openings for guiding the wire into the wire stripping device together with the actuator, where the actuator is spring biased longitudinally to maintain the movable blade in a retracted and open position when not depressed. Optionally, the actuator has a rounded dome-shape, but may also be flat or have bumps or depressions thereon for facilitating operation thereof and without interfering with the normal operation of the multi-function hand tool.

Still another feature of the present invention is to provide a wire stripping device incorporated into the handle of a multi-function hand tool that is simple in construction, easy to use, effective for its particular purposes and relatively inexpensive to manufacture.

The above and other aspects, features and advantages of the present invention will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 4 shows a perspective view of a wire stripping multi-tool in accordance with a preferred embodiment of the present invention;

FIG. 5 shows partial perspective view of the upper portion of the wire stripping multi-tool of FIG. 4 further showing a partial cut-away portion of the opening for providing the wire stripping mechanism;

FIG. 19 shows partial perspective view of the upper portion of the wire stripping multi-tool of FIG. 15 further showing a partial cut-away portion of the opening for providing the wire stripping mechanism and a wire positioned therein;

FIG. 20 shows a partial side cross-sectional view of the wire stripping multi-tool of FIG. 19 taken along line 20-20 with the cutting members in a first position;

DETAILED DESCRIPTION OF THE PREFERRED EMBODIMENTS

Figure 1:
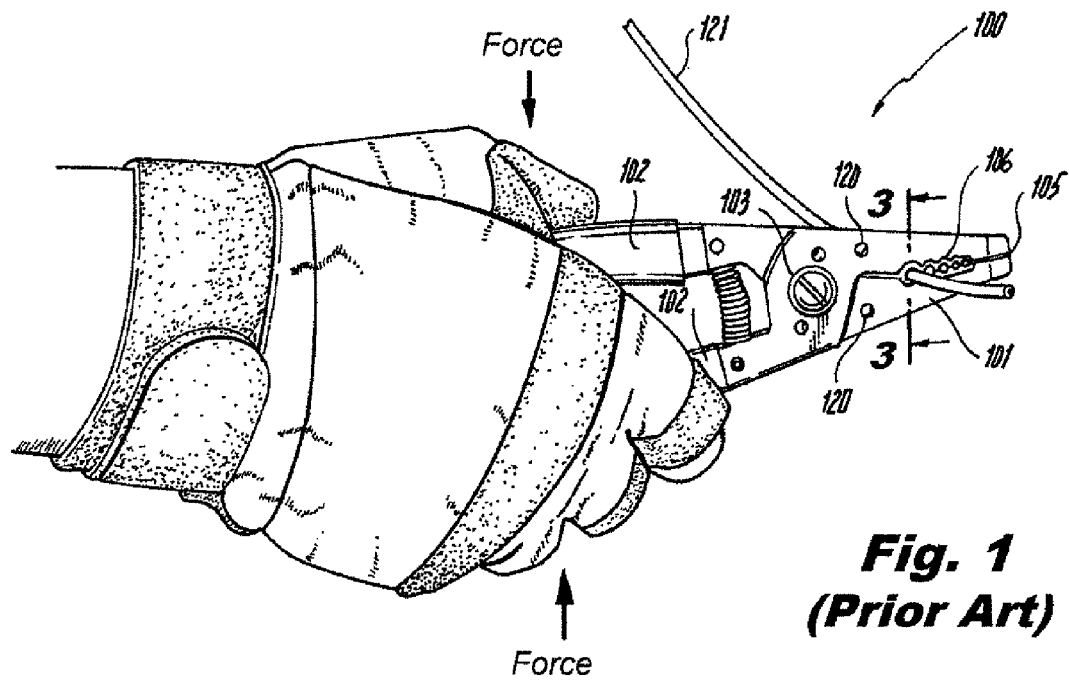
FIG. 1 shows a front plan view of a wire stripping and/or cutting tool positioned in a hand of a user and with a wire positioned to be stripped and/or cut according to the prior art.
Figure 2:
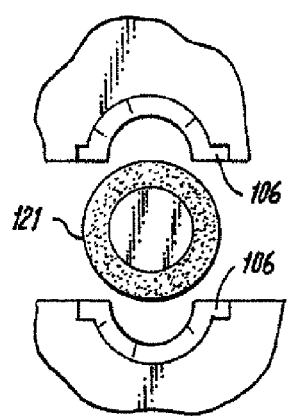
FIG. 2 shows a partial cross-sectional view of the blades of the wire stripping tool of FIG. 1 as they encircle the wire to be stripped in accordance with the prior art.
Figure 3:
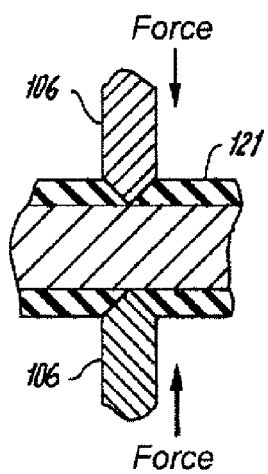
FIG. 3 shows a partial side cross-sectional view of the prior art wire stripping tool of FIG. 1 taken along line 3-3.
Figure 6:
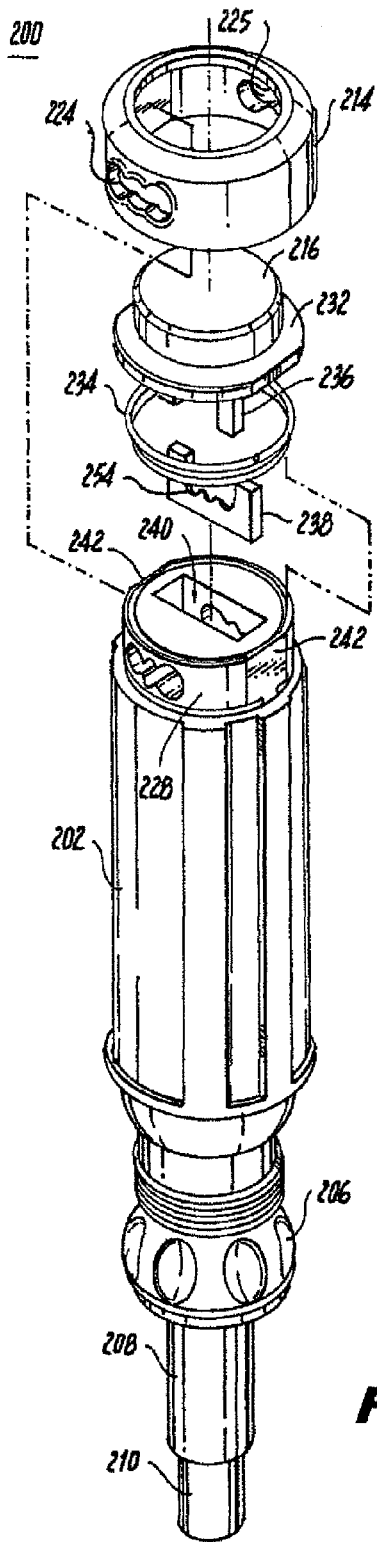
FIG. 6 shows an exploded perspective view of the wire stripping multi-tool of FIG. 4.
Figure 7:
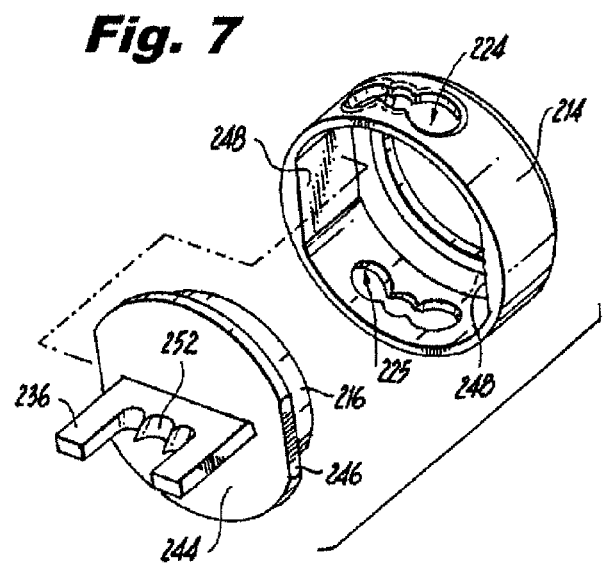
FIG. 7 shows a partial exploded view of the upper end components of the wire stripping multi-tool of FIG. 4 in accordance with the present invention.
Figure 8:
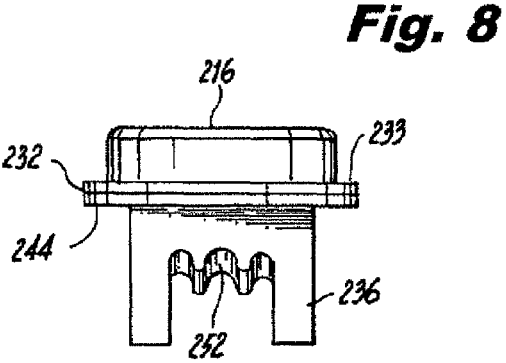
FIG. 8 shows a side plan view of the upper shearing or cutting member configured as a part of a pushbutton member in accordance with the invention.
Figure 9:
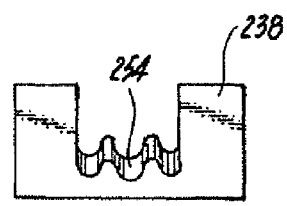
FIG. 9 shows a side plan view of the lower shearing or cutting member for engaging with the upper shearing or cutting member to cut and/or shear the insulation from a wire.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, below, etc., or motional terms, such as forward, back, sideways, transverse, etc. may be used with respect to the drawings. These and similar directional terms should not be construed to limit the scope of the invention in any manner.

Referring first to FIGS. 4-14, shown are various views of a preferred embodiment of a wire stripping multi-function hand tool 200 constructed in accordance with the present invention. As depicted more clearly in FIG. 6, the multi-function wire stripping hand tool 200 disclosed herein includes an elongated handle 202 and shank or coupling member 210 connected thereto at the handle lower end 206 by a connecting member 208 for receiving any of a plurality of tool bits 212. Preferably, the multi-function hand tool 200 comprises any number of tool bits 212 such as a conventional screwdriver blade, a crossed screwdriver head, a pointed end, and the like. As such, the tool bit 212 is removable positionable in the coupling member 210 during use. The other end of the tool 200 comprises a handle 202 of generally cylindrical cross-sectional area and optionally having longitudinal ribs thereon for improved gripping by a user. The particular shape, configuration and size of the tool 200 may vary depending upon the particular size requirement of the individual using the tool 200.

Turning next to FIGS. 6-9, the multi-function hand tool 200 preferably comprises a wire stripping device mechanism configured within an upper end of the handle 202 of the tool 200. The handle 202 may be constructed of any suitable material normally employed for hand tool handles such as plastic, wood, metal, or the like. The handle 202 is provided with a longitudinally extending cavity 240 therein, which communicates with a laterally extending opening or bore 224. The laterally extending opening 224 extends diametrically through the upper end of the tool handle 202, although it may be positioned in any region along the handle 202. The opening 224 is preferably sized and shaped so as to accommodate a plurality of differently sized wires and may have outwardly flared end portions so as to provide easier insertion of the wire 226 into the transverse opening or bore 224 so that it may be engaged by the movable cutting blade 236 and stationary cutting blade 238.

The wire stripping mechanism within the hand tool 200 preferably includes movable cutting blade 236 and stationary cutting blade 238 positioned longitudinally within cavity 240 so as to be guided longitudinally during use. The transverse opening 224 and 225 communicates with the longitudinal cavity 240 within the body of the handle 202. A stationary cutting blade 238 is disposed in the inner end of the cavity 240, while a movable cutting blade 236 is longitudinally movably mounted with push button actuator 216 at an upper end of the longitudinal cavity 240. The movable blade 236 is continuous in an overlapping relation with the stationary blade 238, and an actuator 216 in the preferred form of a push button is connected or affixed to the movable blade 236.

Figure 10A:
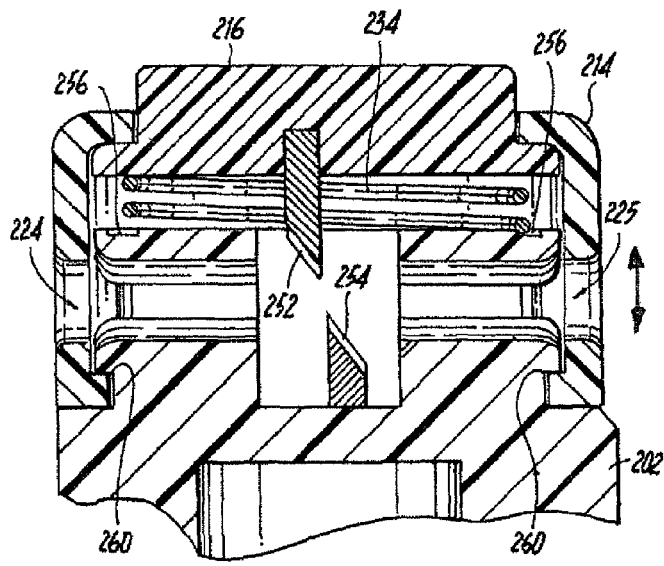
FIG. 10A shows a partial side cross-sectional view of the wire stripping multi-tool of FIG. 4 taken along line 10-10.
Figure 10B:
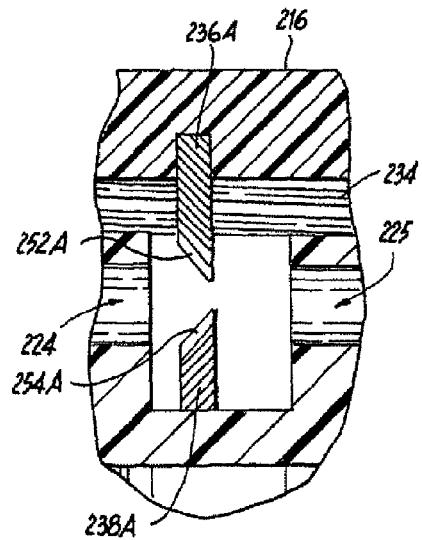
FIG. 10B shows an alternative partial side cross-sectional view of the wire stripping multi-tool of FIG. 4 taken along line 10-10 with the remaining elements as noted in FIG. 10A
Figure 11:
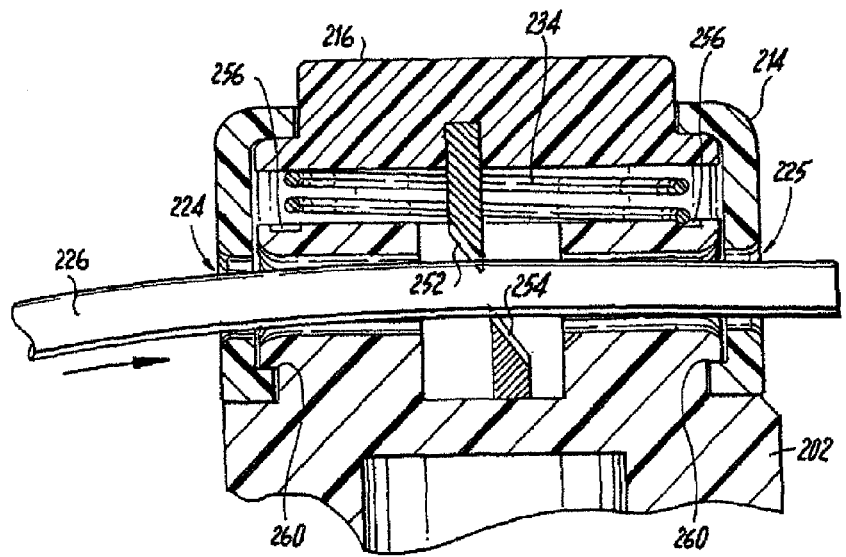
FIG. 11 shows the partial side cross-sectional view of the wire stripping multi-tool of FIG. 10 (i.e., taken along line 10-10 of FIG. 4) further depicting a wire positioned therein whose insulation is to be sheared.

Referring to FIGS. 10A, 10B, and 11, spring 234 is disposed between and engaged with an underside 244 of the flange 232 of the push button actuator 216 so as to urge the movable blade 236 to an open and retracted position when not in use. An end retaining cap 214 is secured around actuator 216 to hold the actuator in place on an upper end 228 of handle 202. Preferably, retaining cap 214 has inner coupling walls 248 that are configured so as to interface with outer coupling walls 242 on the upper end 228 of handle 202 and interface with outer coupling edges 246 of flange 232. Coupling walls 248, 242 and coupling edges 246 are configured so as to secure the actuator 216 in position so as to not permit rotation thereof and maintain movable cutting blade 236 in alignment with stationary blade 238. Preferably the stationary blade 238 and movable cutting blade 236 have curved or arced upper and lower cutting edges 252, 254 which mirror a shape or configuration of wire 226 to be stripped. Optionally, cutting blades 236, 238 each has a plurality of arced or curved cutting edges 252, 254 each being sized to match different gauge or size wires 226. As will be understood from review of FIG. 10B, alternative blades 236A, 238A may be provided with similar-facing arced or curved cutting edges 252A, 254A, understood as shown to be set at an angle about 25-45°, and preferably about 30°, relative to a perpendicular to the tool axis. This is in contrast to the blade-angle arrangement noted in FIG. 10A where the angles are opposed. It will be understood that in FIG. 10B the blades meet upon use so as to provide a uniform pressure on wire 226 and thus minimize a risk of over-cutting and penetrating the wire-core of the wire to be stripped and thereby damaging a current-carrying capacity thereof. Other angle-arrangements and facing or opposing blade arrangements may be used within the skill of those in the art having studied this disclosure without departing from the scope and spirit of the present invention.

When in an open or retracted position (see FIG. 10A), the arced or curved cutting edges 252, 254 of the movable and stationary blades 236, 238 define an opening therebetween which is aligned with the transverse openings 224, 225. Cavity 240 is defined within a central longitudinal region of the upper end 228 of the handle 202 of the hand tool 200 and defines a guide region for the movable blade 236. The guide region includes lateral openings the side walls thereof for allowing the wire 226 to pass therethrough when the movable blade 236 is in an open and retracted position. The openings in the side walls are preferably aligned with the transverse openings 224, 225 in the handle 202 and the curved cutting edges 252, 254 of the movable and stationary blades 236, 238. The stationary blade 238 is preferably securely fixed in position within the cavity 240 and secured to the inner side walls thereof so as to not move during use. The stationary cutting blade 238 is configured and positioned so as to be slightly off set with respect to the movable blade 236 such that when the blades 236, 238 are moved to a closed position (see FIGS. 11-14) by depressing actuator 216, the blades meet to cut into the entire circumference of the wire sheathing 264 but not cut into the wire core 262 of wire 226 in order to strip a portion of the sheathing 264 from the wire core 262.

Figure 12:
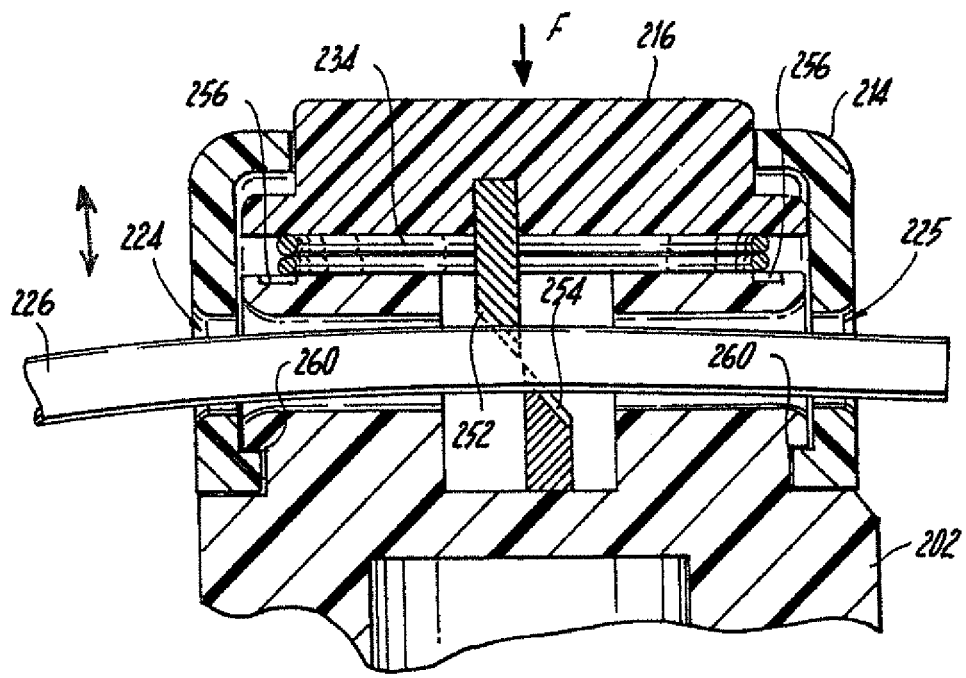
FIG. 12 shows the partial side cross-sectional view of the wire stripping multi-tool of FIG. 10 (i.e., taken along line 10-10 of FIG. 4) further depicting the cutting of the wire positioned therein with a force F applied to the top of the multi-tool.
Figure 13:
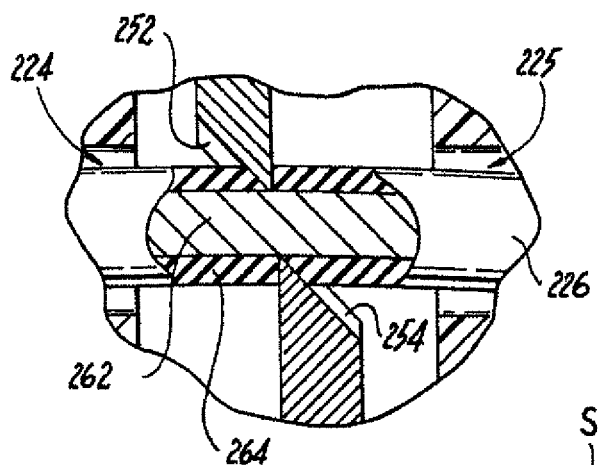
FIG. 13 shows a partial cut-away close-up view of the wire insulation being engaged by the cutting members as shown in FIG. 12 further depicting the cutting members only cutting into the wire sheath or insulation and not damage the core wire.
Figure 14:
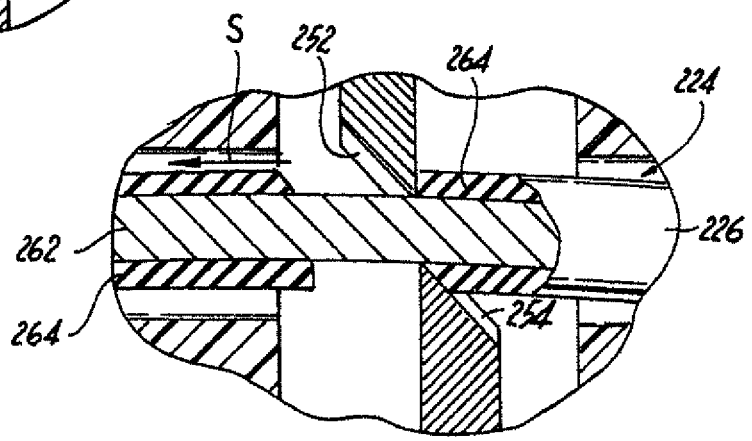
FIG. 14 shows a partial cut-away close-up view of the wire insulation being engaged by the cutting members as shown in FIGS. 12-13 further depicting the wire being stripped S as the wire is removed from the multi-tool after the insulation has been cut.

The size of the transverse openings 224, 225 will generally preclude any possible danger of insertion of fingers or the like into the area between the cutting blades 252, 254. However, an outward taper of openings 224, 225 will serve to guide the insulated wire 226 into the area formed by the movable and stationary cutting members 336, 338 as illustrated in FIGS. 12-14. Then upon depression of the actuator 216 by exerting pressure thereon, the insulation 264 of wire 226 will be cut through to the wire core 262 substantially around the circumference of the wire 226 thereby enabling the insulation 264 to be stripped from the wire core 262 by exerting longitudinal force on the insulation which is very easy to accomplish since it is only necessary to move the handle 202 longitudinally of the insulated wire after the insulation 264 has been substantially severed. This eliminates the necessity for rotation of the wire stripping device about the longitudinal axis of the insulated wire, as needed with prior stripping tools, although this could be done if required.

Inasmuch as the cavity 240 need not be the same size throughout its length, the lower portion thereof is only of sufficient size to receive the stationary cutting blade 238 and it is also within the scope of the invention herein to have the stationary blade 238 molded into the handle 202 if made of plastic although the wire stripping mechanism is also adaptable for use with various types of handles. A notch serves to enable movement of the lower recessed end of the actuator 216 during normal operation thereof thus further enabling the longitudinal axis of the actuator 216 to be aligned with the longitudinal axis of the movable cutting blade 236 thereby effectively transmitting longitudinal force to the movable cutting blade 236.

Figure 15:
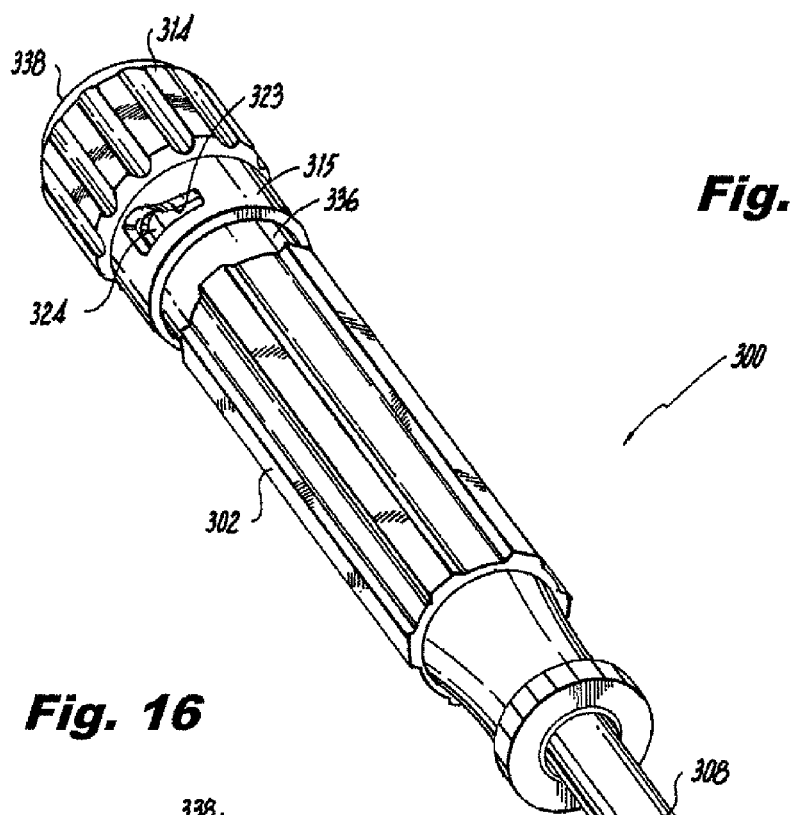
FIG. 15 shows a perspective view of a wire stripping multi-tool in accordance with an alternative embodiment of the present invention.
Figure 16:
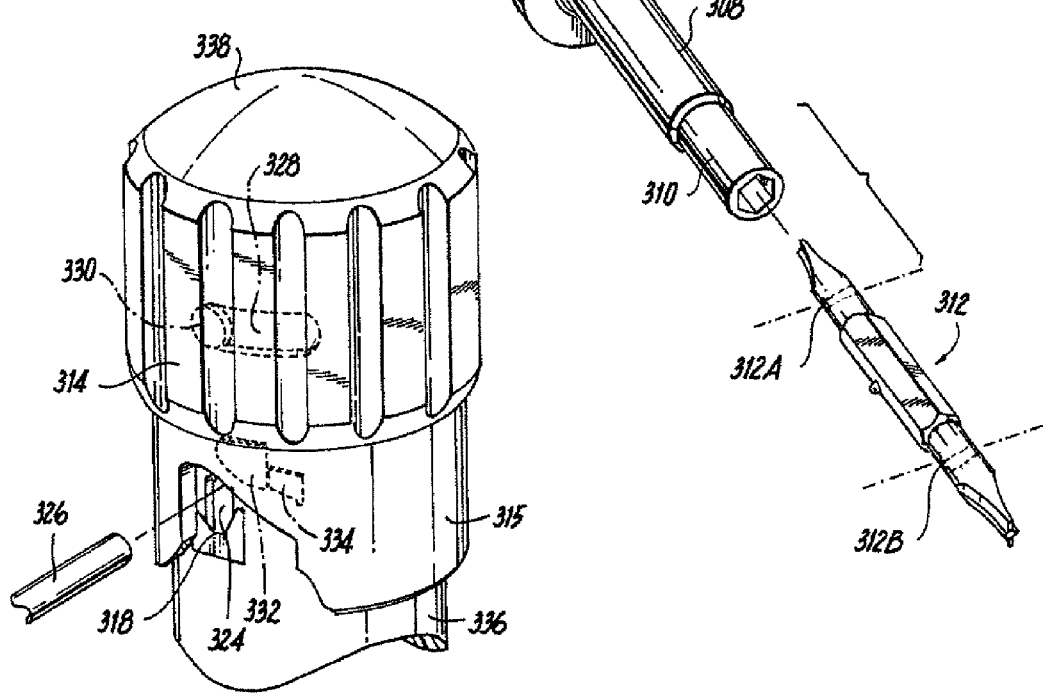
FIG. 16 shows partial perspective view of the upper portion of the wire stripping multi-tool of FIG. 15 further showing a partial cut-away portion of the opening for providing the wire stripping mechanism.
Figure 17:
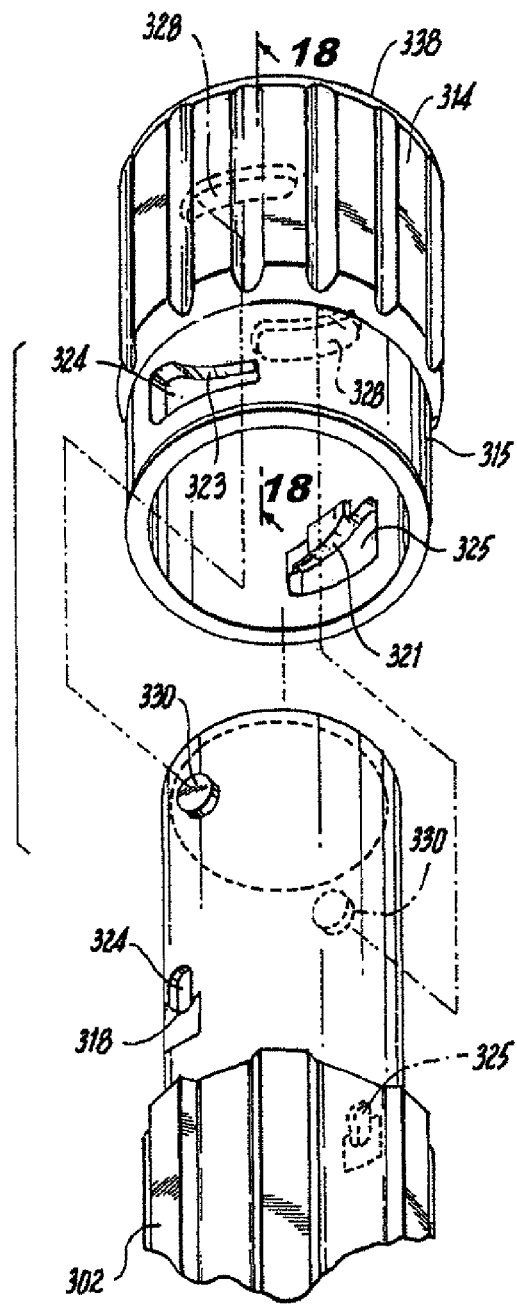
FIG. 17 shows a partial exploded perspective view of a portion of the wire stripping multi-tool of FIG. 15.
Figure 18:
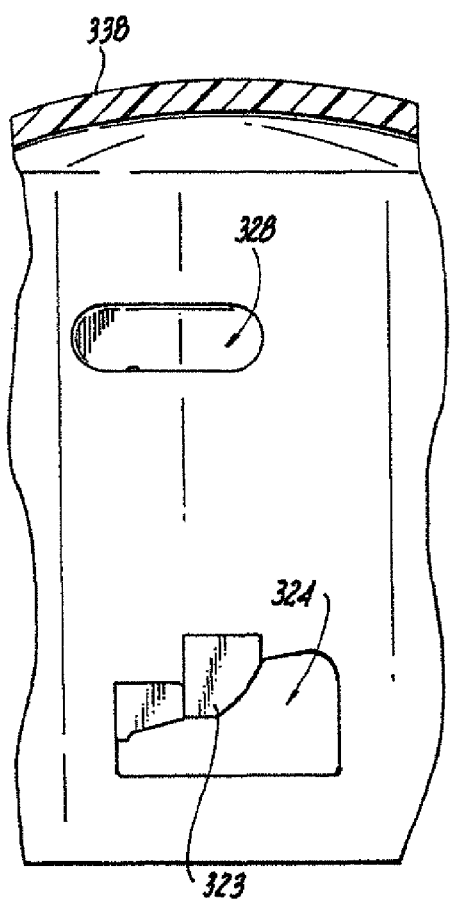
FIG. 18 shows a partial side cross-sectional view of the wire stripping multi-tool of FIG. 15 taken along line 18-18.
Figure 21:
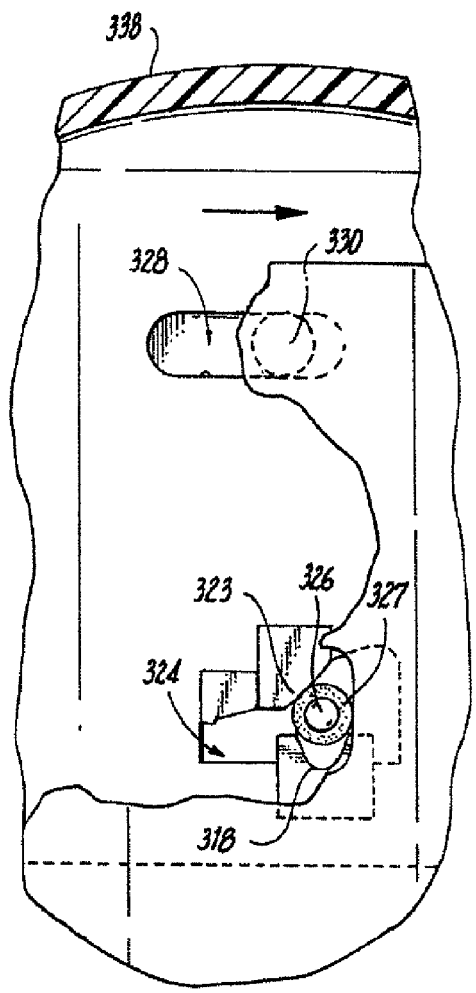
FIG. 21 shows a partial side cross-sectional view of the wire stripping multi-tool of FIG. 19 taken along line 20-20 with the cutting members in a second position.
Figure 22:
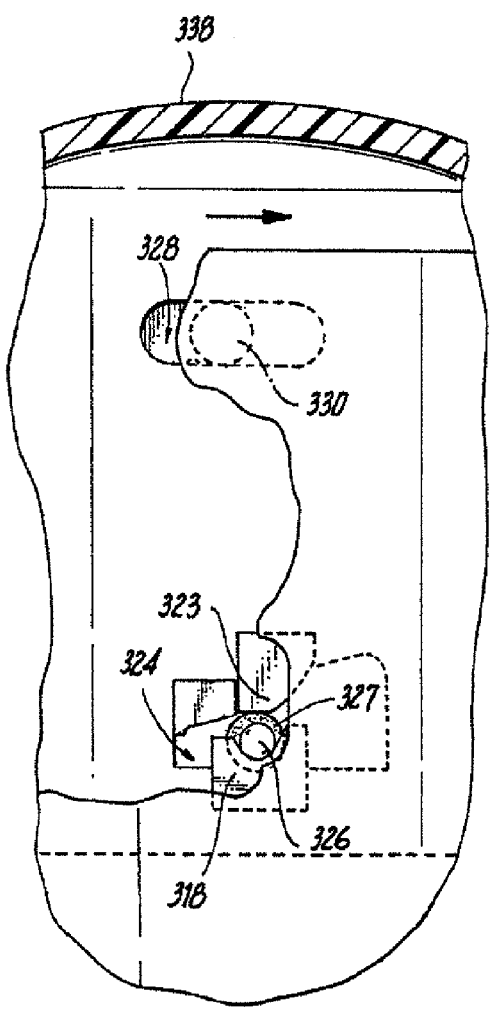
FIG. 22 shows a partial side cross-sectional view of the wire stripping multi-tool of FIG. 19 taken along line 20-20 with the cutting members in a third position.
Figure 23:
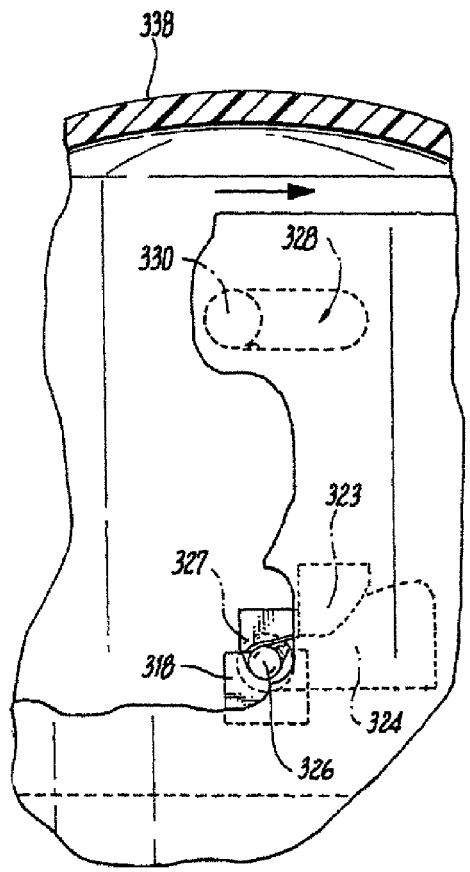
FIG. 23 shows a partial side cross-sectional view of the wire stripping multi-tool of FIG. 19 taken along line 20-20 with the cutting members in a fourth position.
Figure 24:
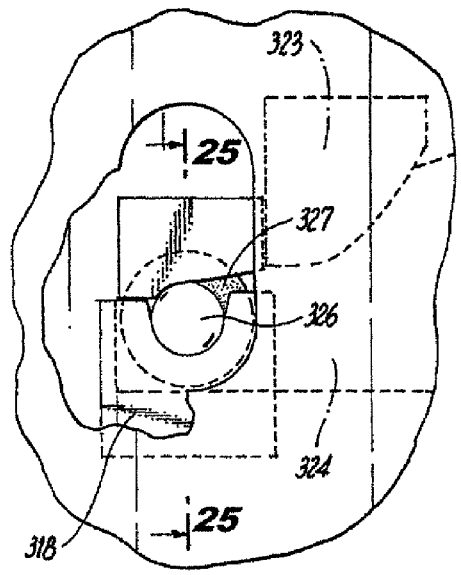
FIG. 24 shows a partial cut-away close-up view of the wire insulation being engaged by the cutting members as shown in FIGS. 20-23.
Figure 25:
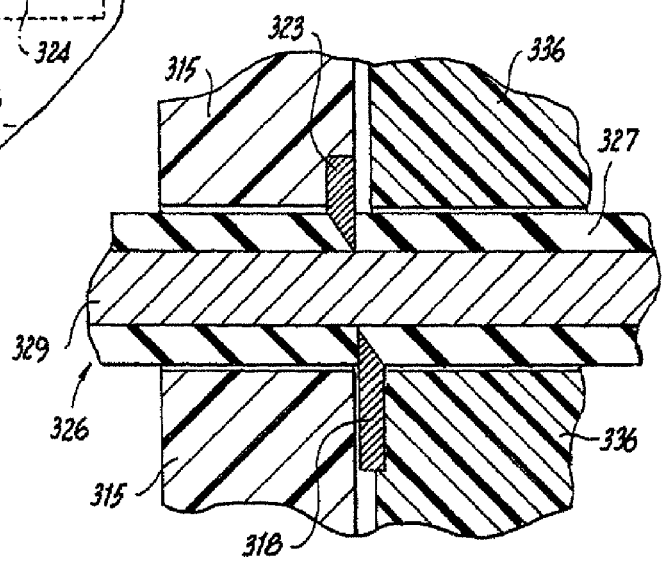
FIG. 25 shows a partial cut-away close-up view of the wire insulation being engaged by the cutting members of the multi-tool further depicting the cutting members only cutting into the wire sheath or insulation and not damaging the core wire.
Figure 26:
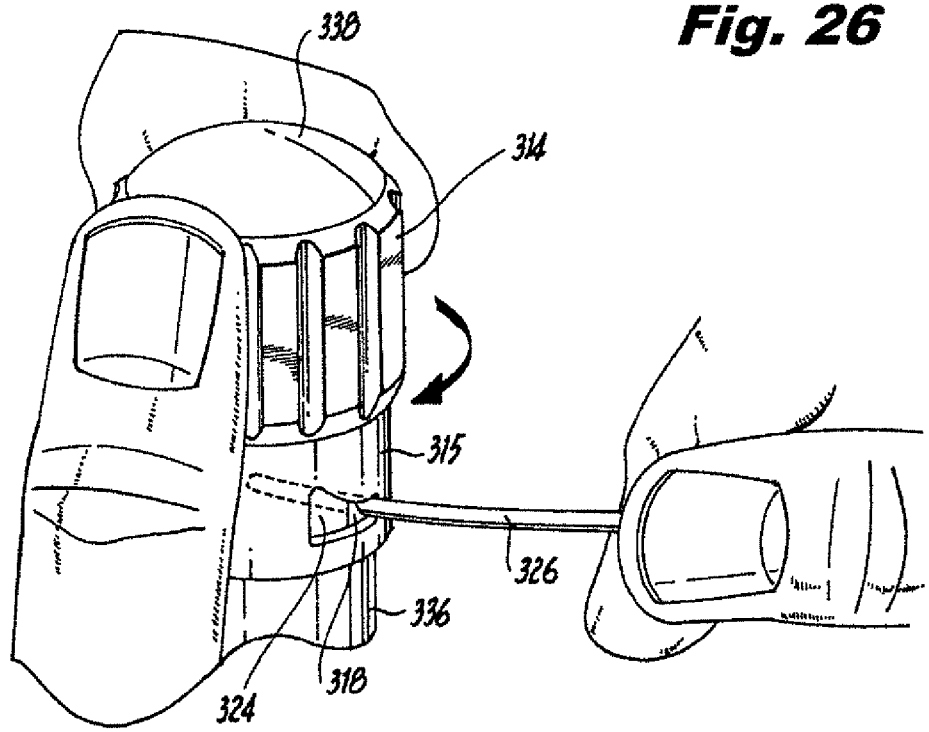
FIG. 26 shows a partial perspective view of the wire stripping multi-tool according to the alternate embodiment of the invention during a use thereof.
Figure 27:
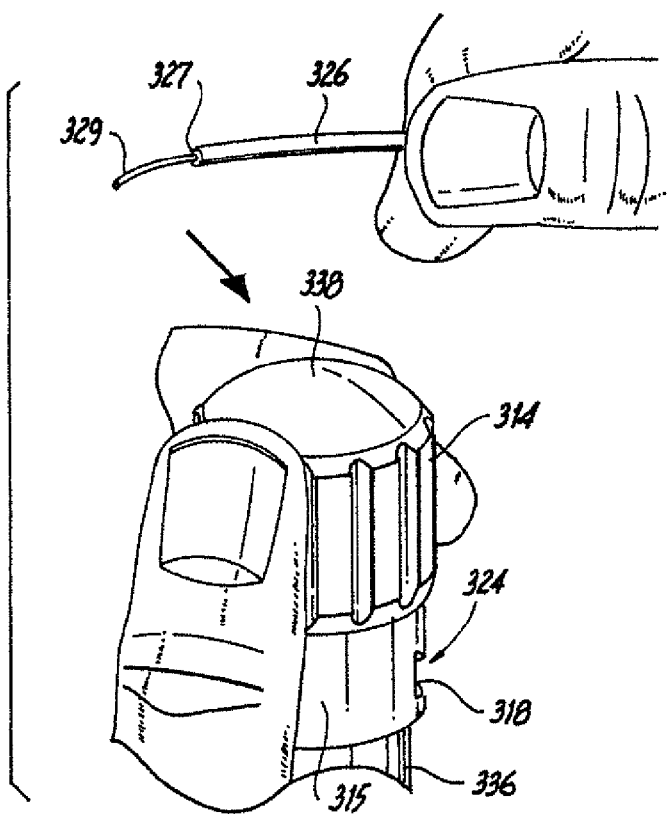
FIG. 27 shows a partial perspective view of the wire stripping multi-tool according to the alternate embodiment of the invention after a use thereof.

Turning next to FIGS. 15-27, shown are various views of an alternate embodiment of a wire stripping multi-function hand tool 300 constructed in accordance with an alternate embodiment of the present invention. As depicted, the wire stripping hand tool 300 according to the alternate embodiment of the invention includes handle 302, connecting element 308, coupling member 310, one or more tool bits 312, end cap member 314, first opening 324, second opening 325 (optional), lower cutting edge 318, first and second guide elements 323/321, and cavity 328 within the handle 302. As seen in the partial perspective view of FIG. 16 showing the upper portion of the wire stripping multi-tool of FIG. 15 including a partial cut-away portion of the opening for providing the wire stripping mechanism, the wire 326 to be stripped is inserted into opening 324 to a desired depth of wire 326 to be stripped. Cap 314 is then rotated such that guide 323 exerts pressure onto wire 326 thereby urging with pressure an opposite side of wire 326 downward onto cutting edge or blade 318.

It will be understood that tool bits 312 may include additional wire-bending openings 312A, 312B having different diameters to receive different gauge wires accordingly (for example gauges 8, 10, 12 etc.) via such through-holes. In use, the outer profile of tool bit 312 is used to form a curve in an exposed wire portion inserted into a selected wire-bending opening 312 while the hand tool 300 is rotated about its long axis using the outer surface of bit 312 to guide the curve of the wire tail portion. This aids in forming correctly-shaped wire-tip ends for use in wiring. It will be understood that tool bit 312 may be used with any other hand-tool suggested herein, including hand tool 200, as well as alternatively scissor-type hand tools, for example in a slide-out or rotate-out orientation from the end of one handle of a scissor-type hand tool.

It will also be understood, that the present device may be modified for combination with other, alternative hand tools, such as a scissor-action type hand tool without departing from the scope and spirit of the present invention. For example, a spring-based pressure-wire-stripper similar to those shown herein may be provided on one of the handles of a scissor-type hand tool or multi-tool. So that, upon such a handle, a wire-pulling direction could either be in line with a scissor-handle direction or in a direction generally perpendicular to the scissor-handle direction.

Also in accordance with the present invention, provided is a method for the stripping of insulation or sheathing from a wire while minimizing the stress placed upon a user's hand or wrist during use. Preferably, a first step involves inserting a wire to a desired depth for stripping into a transverse opening in a side of a handle of a hand tool. Once the desired depth of wire has been inserted into the opening, the user depresses a push button actuator at an upper end of the hand tool which in turn urges a curved or arched blade or cutting member downward upon the wire to be stripped. As pressure is placed upon the wire, an opposite side of the wire is further forced downward upon a second curved or arched blade or cutting edge such that the blades pierce an outer sheathing of the wire but not the wire core. While the actuator is depressed, the wire may be removed from the opening and because the sheathing has been circumferentially severed, the sheathing becomes separated from the wire core for the desired depth.

In accordance with the present invention, it is additionally noted that the provided disclosure notes that there is a method of using the device including basic steps of inserting a wire and removing the sheathing therefrom.

REFERENCE NUMERALS 100 wire stripper
101 cutter head
102 handles
103 pivot assembly
105 pliers jaw
106 cutting jaws
120 holes
121 wire
200 wire stripping multi-function hand tool
202 handle
206 handle lower end
208 connecting element
210 coupling member
212 tool bit
214 retaining cap member
216 push button actuator
224 first opening
225 second opening
226 wire
228 handle upper end
230 first inner opening
232 flange
233 flange top
234 spring
236, 236A movable cutting member or blade
238, 238A stationary cutting member or blade
240 cavity
242 outer coupling wall
244 flange bottom
246 outer coupling edge
248 inner coupling wall
252, 252A upper cutting edge
254, 254S lower cutting edge
256 spring retaining cavity or groove
260 lip
262 wire core
264 wire sheath or insulation
300 wire stripping multi-function hand tool
302 handle
306 handle lower end
308 connecting element
310 coupling member
312 tool bit and 312A, 312B tool bit holes
314 end cap member
315 lower sidewall
318 lower cutting edge
321 second guide element
323 first guide element
324 first opening
325 second opening
326 wire
327 wire sheath or insulation
328 cavity
329 wire core
330 protrusion
336 upper handle end
338 top In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A multi-function wire stripping hand tool, said hand tool comprising:
    a handle having a first end, a second end, and a longitudinal cavity therein, said first end having a transverse bore therethrough;
    a plurality of tool bit members;
    a coupling member having a proximate end disposed in and extending from said first end of said handle, said coupling member having a distal end for receiving an end of at least one of said plurality of tool bits; and
    a wire stripping mechanism, comprising:
        an actuator longitudinally positioned with respect to said handle;
        first and second blade members;
        a spring member disposed between said actuator and said first end, said spring member for urging said second blade member to an open position; and
        a retaining cap member for securing said actuator and said spring on said first end;
        wherein first and second blade members are slidably engaged within said cavity upon actuation of said actuator to engage a wire and circumferentially sever a sheathing on said wire.

2. The tool according to claim 1, wherein said coupling member removably engages said plurality of tool bit members and comprising a unitary one-piece first cylindrical housing having oppositely disposed ends.

3. The tool according to claim 1, wherein an exterior wall of said first end is configured to cooperate with an inner end of said retaining cap.

4. The tool according to claim 1, wherein said first blade member press fit into said cavity.

5. The tool according to claim 1, further comprising a spring retaining groove.

6. The tool according to claim 1, wherein an exterior wall of said first end is threaded to cooperate with a threaded inner wall of said retaining cap member.

7. The tool according to claim 1, wherein:
at least one of said tool bit members, comprises:
a wire-bending opening for receiving and bending an external wire during a use.

8. The tool according to claim 1, wherein:
said handle further contains at least one wire bending member.

9. The tool, according to claim 1, wherein an exterior wall of said first end is engagingly shaped to slidingly cooperate with an inner wall of said retaining cap.

10. A multi-function wire stripping tool, said tool comprising:
an elongated handle member having a longitudinal bore in communication with a transverse bore therein, said longitudinal bore communicating with one end of said handle member;
a first cutting blade disposed at an inner end of said longitudinal bore, a second cutting blade longitudinally mounted within said longitudinal bore, said second cutting blade being positioned for an overlapping relation to said first cutting blade; and
an actuator connected to said second cutting blade with a spring disposed between said actuator and said handle member for urging said second cutting blade to an open position, said first and second blades each having curved cutting edges defining an opening therebetween aligned with said transverse bore when said second blade is in said open position.

11. The tool according to claim 10, further comprising a coupling member removably engages said plurality of integral tool bit members and comprising a unitary one-piece first cylindrical housing having oppositely disposed ends.

12. The tool according to claim 10, wherein an exterior wall of said inner end is configured to cooperate with an inner end of a retaining cap.

13. The tool according to claim 10, wherein said first cutting blade press fit into said cavity.

14. The tool according to claim 10, further comprising a spring retaining groove.

15. The tool according to claim 10, wherein an exterior wall of said inner end is threaded to cooperate with a threaded inner wall of a retaining cap member.

16. The tool according to claim 10, wherein:
said multi-function wire stripping tool further comprises a plurality of tool bit members;
at least one of said tool bit members, comprises:
a wire-bending opening for receiving and bending an external wire during a use.

17. The tool according to claim 10, wherein:
said handle further contains at least one wire bending member.

18. The tool, according to claim 10, wherein an exterior wall of said first end is engagingly shaped to slidingly cooperate with an inner wall of a retaining cap member.

19. A kit for providing a multi-function wire stripping hand tool, said kit comprising:
a hand tool having an elongated handle portion and a coupling member;
a plurality of tool members;
a storage container having a plurality of cavities for housing said hand tool and said plurality of components; and
a wire stripping mechanism, comprising:
an actuator longitudinally positioned with respect to said handle;
first and second blade members;
a spring member disposed between said actuator and said first end; and
a retaining cap member for securing said actuator and said spring on said first end;
wherein said coupling member is configured for removably receiving at least one of said plurality of tool members.

20. The kit according to claim 19, wherein said tool members are single or double ended tool bit members.

21. The kit according to claim 19, wherein said at least one of said tool members is selected from the group consisting of a flat head screw driver bit, a crossed head screw driver bit, a hexagonal nut head, a pointed head, and a saw blade.

22. The tool according to claim 19, wherein:
at least one of said tool members, comprises:
a wire-bending opening for receiving and bending an external wire during a use.

23. The tool according to claim 19, wherein:
said handle portion further contains at least one wire bending member.

24. The kit according to claim 19, wherein an exterior wall of said elongated handle portion is engagingly shaped to slidingly cooperate with an inner wall of said retaining cap member.

25. A wire stripping system in a multi-function hand tool, said system comprising:
a wire stripping member operably disposed within a first end of a handle of a hand tool;
said wire stripping member including an actuator longitudinally positioned with respect to said handle, first and second blade members, a spring member disposed between said actuator and said first end, and a retaining cap member for securing said actuator and said spring on said first end;
said handle defining a hand tool axis;
tool bit members, each tool bit member being formed with oppositely disposed tool bit ends;
a coupling member having a proximate end and a distal end, said coupling member comprising means for removably, non-rotatably, holding said coupling member proximate end in said handle, said coupling member comprises a unitary one-piece first housing having oppositely disposed open ends and two unitary one-piece second housings having oppositely disposed open ends, each of said second housings being slidably non-rotatably received in the respective opposite ends of the first housing, said first tool bit member being slidably disposed in one second housing end, and said second tool bit member being slidably disposed in said other second housing end, whereby each tool bit is alternatively operably disposed in the distal end of said coupling member.

26. The system according to claim 25, wherein said coupling member removably engages said plurality of tool bit members and comprising a unitary one-piece first cylindrical housing having oppositely disposed ends.

27. The system according to claim 25, wherein an exterior wall of said first end is configured to cooperate with an inner end of said retaining cap.

28. The system according to claim 25, wherein said first blade member press fit into said cavity.

29. The tool according to claim 25, further comprising a spring retaining groove.

30. The tool according to claim 25, wherein:
at least one of said tool bit members, comprises:
a wire-bending opening for receiving and bending an external wire during a use.

31. The tool according to claim 25, wherein:
said handle further contains at least one wire bending member.

32. The system, according to claim 25, wherein an exterior wall of said first end is engagingly shaped to slidingly cooperate with an inner wall of said retaining cap.

33. A driving hand tool, said hand tool comprising:
a handle having a first end, a second end, and a longitudinal cavity therein, said first end having a transverse bore therethrough;
a plurality of tool bit members;
a coupling member having a proximate end disposed in and extending from said first end of said handle, said coupling member having a distal end for receiving an end of at least one of said plurality of tool bits;
a wire stripping mechanism, comprising:
an actuator longitudinally positioned with respect to said handle;
first and second blade members;
a spring member disposed between said actuator and said first end; and
a retaining cap member for securing said actuator and said spring on said first end; and
at least one of said tool members, further comprising:
a wire-bending opening for receiving and bending an external wire during a use.

34. The tool according to claim 33, wherein:
said handle further contains at least one wire bending member.

35. A driving hand tool, said hand tool comprising:
a handle having a first end, a second end, and a longitudinal cavity therein, said first end having a transverse bore therethrough;
at least one tool bit member;
a coupling member having a proximate end disposed in and extending from said first end of said handle, said coupling member having a distal end for receiving an end of said at least one tool bit member;
a wire stripping mechanism, comprising:
an actuator longitudinally positioned with respect to said handle;
first and second biased blade members; and
said at least one tool member, further comprises:
a wire-bending opening for receiving and bending an external wire during a use.

36. The tool according to claim 35, wherein:
said handle further contains at least one wire bending member.

* * * * *